Jan. 29, 1935.　　　G. E. BEHNKE　　　1,989,260

ROLLER BIT

Original Filed Dec. 1, 1932

Guy E. Behnke
INVENTOR.

BY

ATTORNEY.

Patented Jan. 29, 1935

1,989,260

UNITED STATES PATENT OFFICE 1,989,260

ROLLER BIT

Guy E. Behnke, Oklahoma City, Okla., assignor to Reed Roller Bit Company, Houston, Tex., a corporation of Texas Original application December 1, 1932, Serial No. 654,143. Divided and this application August 27, 1934, Serial No. 741,623

3 Claims. (Cl. 255—71)

This invention relates generally to deep well drilling apparatus, and specifically to roller bits, the present application being a division of my application Serial Number 654,143, filed December 1, 1932, which has matured into Patent Number 1,972,256, granted September 4, 1934.

The invention disclosed by the present application has for its object the provision of new and improved bearings for roller cutters, and will be found particularly useful in that conventional type of roller bit including a head having a substantially V-shaped cutter recess in the bottom thereof, and substantially conical cutters in said recess.

A specific object of the invention is to provide a bearing for roller cutters of the conical type including rollers to strongly support the cutters and balls between the rollers and the head to rotatably lock the cutter in place.

Figure 1:
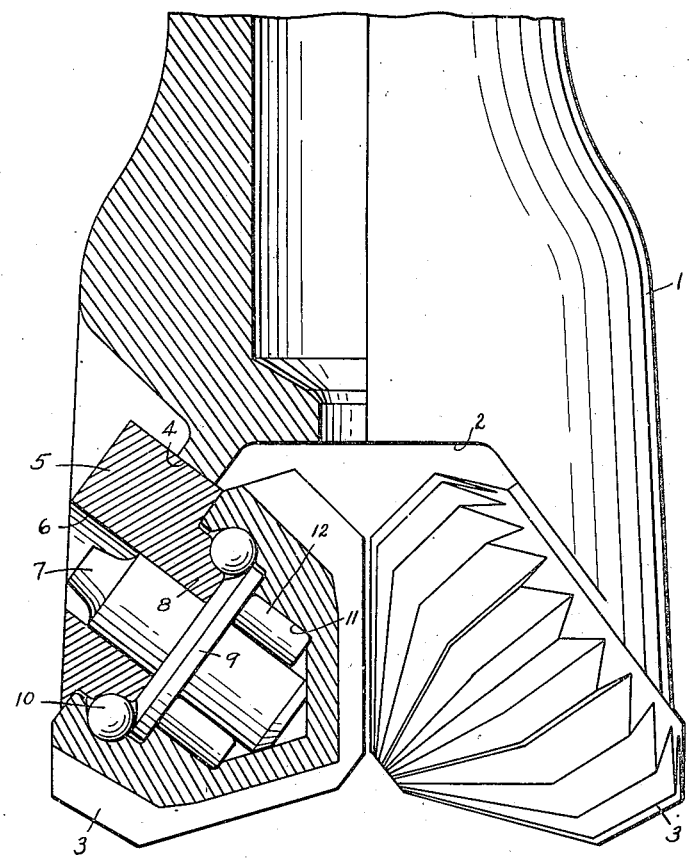
Figure 2:
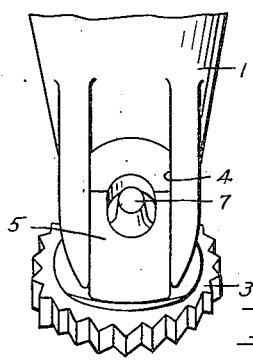

The preferred embodiment of the invention is illustrated by the accompanying drawing, of which Fig. 1 is a partly sectional elevation, and Fig. 2 a detail view at a right angle to Fig. 1.

In the drawing the bit head is indicated at 1. It has in its lower end a substantially V-shaped recess 2 for the reception of the substantially conical roller cutter 3. Each of these cutters is mounted on the head by means which will now be described.

In the wall of the recess is a downwardly opening slot 4 for the reception of a cutter support 5, which may be removably welded therein. The support 5 has an opening 6 to receive the cutter pin 7, which may be removably welded therein, and an annular flange 8 projecting downwardly and inwardly into the recess 2 and surrounding the pin 7. The pin 7 has an annular flange 9 bearing against the annular flange 8 of the support and forming with the flange 8 a raceway for balls 10, and a roller raceway 11 for rollers 12.

The advantages of this contruction will be apparent to those skilled in the art.

I claim:

1. A roller bit having a head, said head having a cutter recess, a support removably secured to said head, a pin removably secured to said support, said support having an annular flange surrounding said pin, and projecting downwardly and inwardly into said recess, said pin having thereon an annular flange bearing against the annular flange of said support and forming with said support flange a ball raceway, said pin having a roller raceway, a cup-shaped cutter enclosing said pin and flange, said cutter having a ball raceway and a roller raceway, balls between the raceway formed by the flanges of said support and pin and the raceway in said cutter, and rollers between the roller raceways of said pin and cutter, said balls serving to rotatably lock said cutter on said pin.

2. A roller bit having a support, a pin removably secured to said support, said support having an annular flange surrounding said pin, said pin having thereon an annular flange bearing against the annular flange of said support and forming with said support flange a ball raceway, said pin having a roller raceway, a cup-shaped cutter enclosing said pin and flange, said cutter having a ball raceway and a roller raceway, balls between the raceway formed by the flanges of said support and pin and the raceway in said cutter, and rollers between the roller raceways of said pin and cutter, said balls serving to rotatably lock said cutter on said pin.

3. A roller bit having a support, a pin removably secured to said support, said support having an annular flange surrounding said pin, said pin having thereon an annular flange forming with said support flange a ball raceway, said pin having a roller raceway, a cup-shaped cutter enclosing said pin and flange, said cutter having a ball raceway and a roller raceway, balls between the raceway formed by the flanges of said support and pin and the raceway in said cutter, and rollers between the roller raceways of said pin and cutter, said balls serving to rotatably lock said cutter on said pin.

GUY E. BEHNKE.